United States Patent
Bunker

(10) Patent No.: US 6,298,953 B1
(45) Date of Patent: Oct. 9, 2001

(54) DISC BRAKE

(75) Inventor: Kenneth James Bunker, Rearsby (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/319,662

(22) PCT Filed: Dec. 8, 1997

(86) PCT No.: PCT/GB97/03387

§ 371 Date: Jun. 10, 1999

§ 102(e) Date: Jun. 10, 1999

(87) PCT Pub. No.: WO98/26191

PCT Pub. Date: Jun. 18, 1998

(30) Foreign Application Priority Data

Dec. 12, 1996  (GB) .................................................. 9625862

(51) Int. Cl.[7] ...................................................... F16D 55/00
(52) U.S. Cl. ..................... 188/71.1; 188/73.1; 188/71.3; 188/71.5
(58) Field of Search ................................. 188/71.1, 71.3, 188/71.5, 72.4, 73.1

(56) References Cited

U.S. PATENT DOCUMENTS

| | | | |
|---|---|---|---|
| 2,064,553 | 12/1936 | Mack | 188/72 |
| 2,260,189 | 10/1941 | Morrison | 188/18 |
| 2,657,773 | 11/1953 | Driscoll | 188/152 |
| 2,667,947 | 2/1954 | Lucien | 188/152 |
| 2,671,532 | 3/1954 | Du Bois | 188/18 |
| 2,672,220 | 3/1954 | Collier | 188/18 |
| 2,707,604 | 5/1955 | Dowty | 244/111 |
| 2,823,770 | 2/1958 | Helvern | 188/72 |
| 2,934,174 | 4/1960 | Lucien | 188/73 |
| 2,943,827 | 7/1960 | Hartel et al. | 244/111 |
| 2,954,850 | 10/1960 | Cislo | 188/71 |
| 2,955,677 | 10/1960 | Jones | 188/18 |
| 2,955,682 | 10/1960 | Kelley et al. | 188/72 |
| 3,094,194 | 6/1963 | Kershner | 188/72 |
| 3,146,860 | 9/1964 | Wilson | 188/72 |

(List continued on next page.)

FOREIGN PATENT DOCUMENTS

| | | | |
|---|---|---|---|
| 27 39 128 | 3/1979 | (DE) | F16D/65/02 |
| 4236683 | * 5/1994 | (DE) . | |
| 4236684 | * 5/1994 | (DE) . | |
| 0 096 553 | 12/1983 | (EP) | F16D/65/12 |
| 0143941 | * 6/1985 | (EP) . | |

(List continued on next page.)

OTHER PUBLICATIONS

Patent Abstracts of Japan, vol. 006, No. 172 (M–154), Sep. 7, 1982 & JP 57 083733A (Akebono Brake Ind. Co. Ltd), May 25, 1982, see abstract and figures.

European Patent Office, Patent Abstracts of Japan, publication No. 57083733, published May 25, 1982 entitled "Caliper for Disc Brake" (Yutaka), assigned to Akebono Brake Ind. Co. Ltd.

*Primary Examiner*—Daniel G. DePumpo
*Assistant Examiner*—David Divine
(74) *Attorney, Agent, or Firm*—Synnestvedt & Lechner LLP

(57) ABSTRACT

A disc brake comprises an operating mechanism operable to move friction material pads into contact with a disc. The operating mechanism comprises a support body located on one side of the disc, a cylinder defined by the support body, and a piston in the cylinder. The operating mechanism also comprises a guidance member for the pads. The guidance member projects from the support body past the disc and supports an abutment on which one of said pads is mounted. The guidance member is mounted on the support body by means of a plurality of bolts which extend through bores in the guidance member to said abutment. The bolts take the load during application of the brake.

3 Claims, 1 Drawing Sheet

U.S. PATENT DOCUMENTS

| | | |
|---|---|---|
| 3,208,559 | 9/1965 | Chambers et al. ................... 188/264 |
| 3,448,831 | 6/1969 | Newstead ............................... 188/73 |
| 3,494,448 | 2/1970 | Ruprecht et al. ...................... 188/73 |
| 3,584,708 | 6/1971 | Heck ................................... 188/71.6 |
| 3,692,148 | 9/1972 | Hauth ................................. 188/18 A |
| 3,758,129 | 9/1973 | Ishikawa et al. .................... 280/96.1 |
| 3,907,081 | 9/1975 | Smith et al. ......................... 188/73.3 |
| 3,940,159 | 2/1976 | Pringle ................................ 280/96.1 |
| 3,951,239 | 4/1976 | Newstead ............................ 188/71.5 |
| 4,018,309 * | 4/1977 | Mery ................................... 188/72.4 |
| 4,075,142 | 2/1978 | Morse et al. ....................... 260/17 R |
| 4,286,694 | 9/1981 | Wiseman, Jr. et al. ............. 188/71.5 |
| 4,358,000 | 11/1982 | Cumming ............................ 188/71.5 |
| 4,418,796 | 12/1983 | Rittmann ............................. 188/71.5 |
| 4,428,461 * | 1/1984 | Warwick ............................. 188/72.4 |
| 4,456,099 | 6/1984 | Kawaguchi ......................... 188/71.6 |
| 4,529,067 | 7/1985 | Scott ................................... 188/18 A |
| 4,560,034 | 12/1985 | Windish et al. .................... 188/72.3 |
| 4,605,103 | 8/1986 | Carré et al. ......................... 188/71.5 |
| 4,609,076 | 9/1986 | Collins et al. ...................... 188/71.5 |
| 4,690,254 | 9/1987 | Couvez .............................. 188/73.36 |
| 4,699,254 | 10/1987 | Mery ................................. 188/73.36 |
| 4,823,920 * | 4/1989 | Evans ................................ 188/73.34 |
| 5,009,293 * | 4/1991 | Takahashi ........................... 188/72.4 |
| 5,040,642 * | 8/1991 | Gregoire ........................... 188/73.44 |
| 5,167,303 * | 12/1992 | Kobayashi .......................... 188/71.1 |
| 5,238,090 | 8/1993 | Weiler ................................ 188/71.6 |
| 5,242,036 | 9/1993 | Hennessy et al. .................. 188/71.6 |
| 5,255,761 | 10/1993 | Zaremsky ........................... 188/71.5 |
| 5,366,046 | 11/1994 | Klaue ................................. 188/71.6 |
| 5,472,068 * | 12/1995 | Weiler ............................... 188/73.44 |
| 5,538,109 | 7/1996 | Swank ............................... 188/264 G |
| 5,622,241 * | 4/1997 | Null ................................... 188/73.42 |
| 6,006,869 * | 12/1999 | Rancourt et al. ................... 188/71.5 |
| 6,019,199 * | 2/2000 | Heidenreich ...................... 188/73.34 |
| 6,044,935 * | 4/2000 | Mery ................................. 188/71.5 |
| 6,073,733 * | 6/2000 | Kapanowski ....................... 188/72.4 |
| 6,223,863 * | 5/2001 | Bunker .............................. 188/18 A |

FOREIGN PATENT DOCUMENTS

| | | | |
|---|---|---|---|
| 0289399 * | 4/1988 | (FR) . | |
| 1161355 | 8/1969 | (GB) | ............................. F16D/55/22 |
| 1467597 | 3/1977 | (GB) | ........................... F16D/55/224 |
| 2 049 845 | 12/1980 | (GB) | ............................. F16D/55/00 |
| 2130318 | 5/1984 | (GB) | ............................. F16D/65/02 |
| 2251466 | 7/1992 | (GB) | ........................... F16D/55/227 |
| WO 89/05924 | 6/1989 | (WO) | ............................. F16D/55/36 |

* cited by examiner

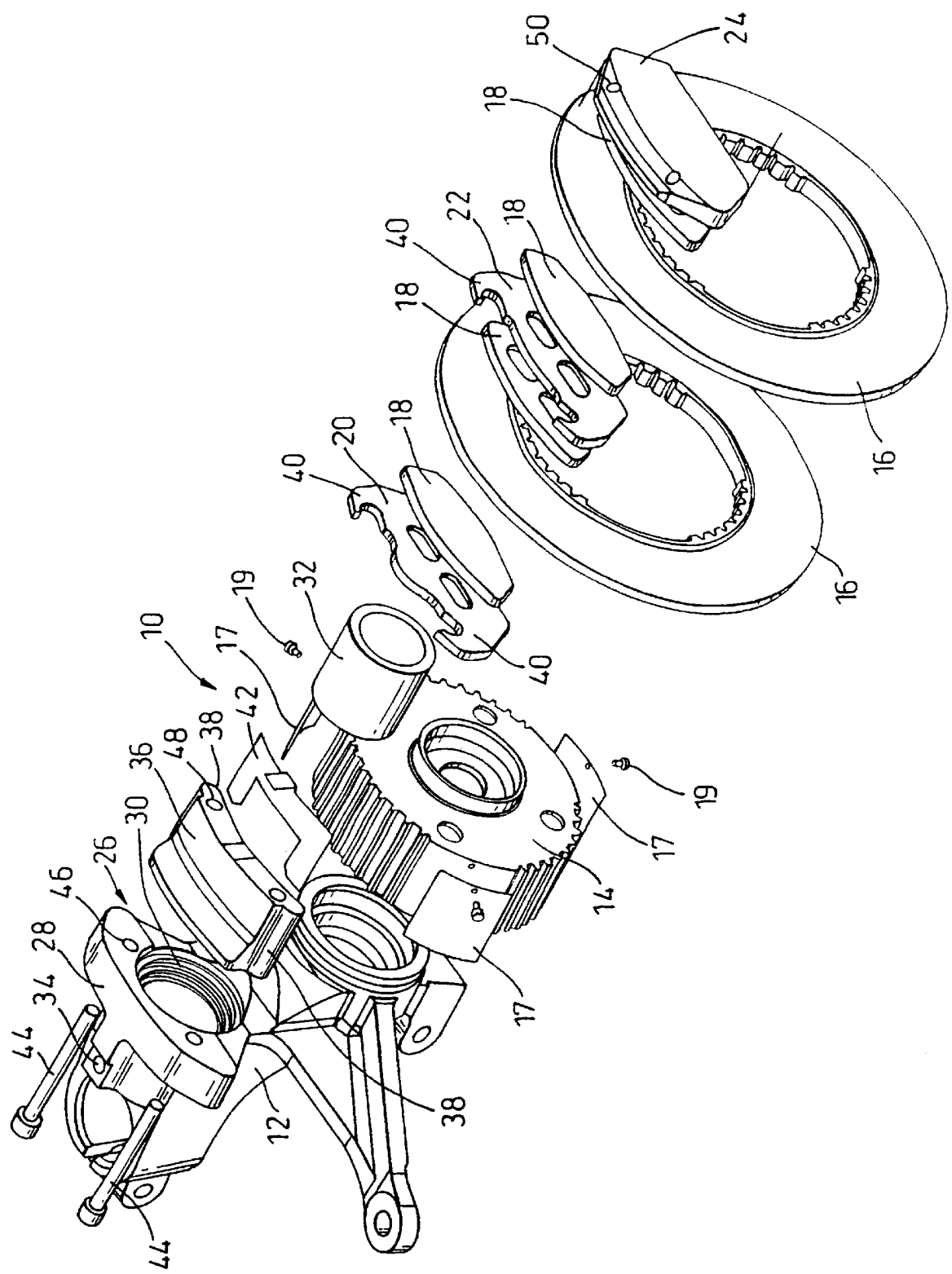

DISC BRAKE

This invention is concerned with a disc brake, for example a disc brake suitable for use in braking a wheel of a vehicle.

A conventional disc brake for a vehicle comprises a disc, friction material pads arranged on opposite sides of the disc, and an operating mechanism operable to move one of the pads into contact with the disc, and to cause relative movement between the operating mechanism and the disc to bring the other pad into contact with the disc so that the pads both apply a braking force thereto. In most cases, the disc is fixedly mounted on a hub and said relative movement is brought about by movement of the operating mechanism which is mounted so that it can slide axially of the disc. It is also possible for the operating mechanism to be fixed relative to the hub and for the disc to be slidable axially on the hub. In the latter case, there may be two or more discs slidable on the hub, and an appropriate number of pads located between the discs so that the operating mechanism can cause all the pads to contact a disc.

In a conventional disc brake as referred to above, the operating mechanism comprises a support body located on one side of the disc, a cylinder defined by the support body, and a piston in the cylinder. The piston is movable, when fluid under pressure is introduced into the cylinder, to urge a first of said pads towards the disc. The operating mechanism also comprises a guidance member projecting from the support body past the disc and supporting an abutment on which the second of said pads is mounted. Said abutment may be attached to the guidance member or may be part thereof. Said first pad is mounted for sliding movement on the guidance member.

In a conventional disc brake as referred to above, the guidance member of the operating mechanism is subject to high bending and shearing reaction forces, when the brake is applied. The bending forces result from the pressure between the pads and the disc. The shearing forces are circumferential forces and are generated by the frictional contact between the pads and the disc which are transferred to the guidance member and thence to the support body. This means that the guidance member is made from expensive high tensile material and, as it has a relatively complex shape, including accurate guidance surfaces for the brake pad, this makes the guidance member difficult and expensive to make.

The invention provides a disc brake comprising a disc, friction material pads arranged on opposite sides of the disc, and an operating mechanism operable to move one of the pads into contact with the disc, and to cause relative movement between the operating mechanism and the disc to bring the other pad into contact with the disc so that the pads both apply a braking force thereto, the operating mechanism comprising a support body located on one side of the disc, a cylinder defined by the support body, and a piston in the cylinder, the piston being movable, when fluid under pressure is introduced into the cylinder, to urge a first of said pads towards the disc, the operating mechanism also comprising a guidance member projecting from the support body past the disc and supporting an abutment on which the second of said pads is mounted, said first pad being mounted for sliding movement on the guidance member, characterised in that the guidance member of the operating mechanism is mounted on the support body thereof by means of a plurality of bolts which extend through bores in the guidance member from the support body to said abutment.

In a disc brake in accordance with the invention, the bending and shearing forces applied to the guidance member are taken by the bolts which can be readily and cheaply obtained with the ability to take high loads so that the guidance member itself can be made from lower strength material which is cheaper and more easy to machine.

Preferably, the bolts are received in threaded bores in either the abutment or the support body. This avoids the necessity for nuts.

There now follows a detailed description, to be read with reference to the accompanying drawing, of a disc brake which is illustrative of the invention.

The drawing is an exploded view of the illustrative disc brake.

The illustrative disc brake 10 is mounted on a suspension link 12 of a vehicle. The suspension link 12 has a hub 14 mounted for rotation thereon. A wheel (not shown) is mounted on the hub in the usual manner. The brake 10 also comprises two discs 16 which are mounted on the hub 14 for axial sliding movement. Specifically, the outer surface of the hub 14 has three circumferentially-spaced surface portions which are formed with axial splines and the discs 16 are formed with teeth which mesh with these splines so that the discs can slide axially on the hub but rotate therewith. The hub 14 has three leaf springs 17 secured thereto by screws 19. The leaf springs 17 are arranged on the surface portions of the hub between the splines thereof and serve to centralise the discs 16 and to prevent them from rattling on the hub.

The brake 10 also comprises friction material pads 18 arranged on opposite sides of each of the discs 16. Specifically, one of the friction pads 18 is mounted on a backing plate 20 on one side of a first of the discs 16, two of the pads 18 are mounted on opposite sides of a backing plate 22 which is between the first and the second discs 16, and one of the pads 18 is mounted on an abutment 24 on an opposite side of the second disc 16 to the backing plate 22.

The brake 10 also comprises an operating mechanism 26 operable to move the pad 18 on the backing plate 20 into contact with the first disc 16. The mechanism 26 is also affective to cause relative movement between the mechanism 26 and the discs 16 to bring the other pads 18 mounted on the backing plate 22 and the abutment 24 into contact with the discs so that the pads all apply a braking force to the discs. Specifically, movement of the pad 18 on the backing plate 20 into contact with the first disc 16 causes the first disc 16 to slide on the hub 14 into contact with one of the pads 18 on the backing plate 22, continued movement brings the other pad 18 on the backing plate 22 into contact with the second disc 16 which, in turn, slides on the hub 14 until the second disc 16 contacts the pad 18 on the abutment 24.

The operating mechanism 26 comprises a support body 28 which is located on one side of the first disc 16. The support body 28 is provided by a portion of the link 12. The operating mechanism 26 also comprises a cylinder 30 defined by the support body 28, and a piston 32 in the cylinder. The piston 32 is movable, when fluid under pressure is introduced into the cylinder 30 through a port 34 to move out of the cylinder and thereby urge the backing plate 20 and the pad 18 mounted thereon towards the first disc 18.

The operating mechanism 26 also comprises a guidance member 36 projecting from the support body 28 past the discs 16. The guidance member 36 supports the abutment 24. The backing plates 20 and 22 and the pads mounted thereon are mounted for sliding movement on the guidance member 36. Specifically, the guidance member 36 has two arcuate side surfaces 38 on which the plates 20 and 22 slide. The plates 20 and 22 having upper hook portions 40 which hook over the surfaces 38 so that the plates 20 and 22 are supported by the member 36 and can slide along the member 36. A leaf spring 42 is provided between the underside of the member 36 and the plates 20 and 22, the spring 42 serving to prevent rattling.

The guidance member 36 of the operating mechanism 26 is mounted on the support body 28 by means of a two high tensile bolts 44 which pass through bores 46 in the support body 28 and bores 48 in the guidance member 36 to enter threaded bores 50 in the abutment 24.

In the operating mechanism 26, introduction of hydraulic fluid under pressure into the cylinder 30 causes the piston 32 to urge the pads 18 into contact with the discs 16 as aforementioned. When this contact has been achieved braking forces between each of the pads 18 and the discs 16 are transmitted to the member 36 via the backing plates 20 and 22 and the abutment 24. However, the high bending and shearing forces applied thereby to the guidance member 36 is taken by the bolts 44.

What is claimed is:

1. A disc brake comprising a disc, a rotatable hub supporting said disc for axial sliding movement thereon, friction material pads arranged on opposite sides of said disc, each pad having a friction surface facing one of said opposite sides, an operating mechanism operable to move a first of the pads into frictional contact with a first surface of the disc and to move the disc on the hub to bring a second surface of the disc into frictional contact with a second of said pads so that both pads apply a braking force thereto, the operating mechanism comprising a support body located on one side of the disc;

a cylinder fixedly mounted on the support body and a piston in the cylinder, the piston being movable when fluid under pressure is introduced into the cylinder to urge a first of said pads towards the disc, a guidance member suspended from the support body, said guidance member projecting from the support body and having an end surface beyond the outer edge of the disc, the first of said pads being suspended from said guidance member for sliding movement thereon, an abutment member fixedly attached to the end surface of said guidance member, said second of said friction material pads being fixedly supported on said abutment member with the friction surface of the pad facing said second surface; and a plurality of bores extending through said guidance member, each said bore having continuing aligned portions in said support body and said abutment and a plurality of elongated tensile bolts for absorbing the bending and shearing forces imposed on said guidance member, each said bolt extending within one of said plurality of bores, including said continuing aligned portions and fixedly interconnecting said support body, said guidance member and said abutment.

2. A disc brake according to claim 1, wherein said guidance member further comprises spaced apart arcuately shaped side surfaces, the first pad further comprising hook members hooking over said arcuately shaped side surfaces and supporting said pad for slidable movement therealong.

3. A disc brake according to claim 2, further including a spring member positioned between the first pad and the guidance member for biasing said first pad to a position away from said guidance member in a direction transversely of the member.

* * * * *